(12) United States Patent
Rathineswaran et al.

(10) Patent No.: US 10,642,646 B1
(45) Date of Patent: May 5, 2020

(54) TECHNIQUES OF SECURELY PERFORMING LOGIC AS SERVICE IN BMC

(71) Applicant: American Megatrends International, LLC, Norcross, GA (US)

(72) Inventors: Chandrasekar Rathineswaran, Cumming, GA (US); Viswanathan Swaminathan, Suwanee, GA (US); Joseprabu Inbaraj, Suwanee, GA (US)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 0 days.

(21) Appl. No.: 16/169,256

(22) Filed: Oct. 24, 2018

(51) Int. Cl.
| | |
|---|---|
| *G06F 9/48* | (2006.01) |
| *G06F 9/54* | (2006.01) |
| *G06F 9/455* | (2018.01) |
| *G06F 9/445* | (2018.01) |
| *G06F 8/60* | (2018.01) |

(52) U.S. Cl.
CPC ........ *G06F 9/4812* (2013.01); *G06F 9/44521* (2013.01); *G06F 9/4552* (2013.01); *G06F 9/4843* (2013.01); *G06F 9/542* (2013.01); *G06F 8/60* (2013.01)

(58) Field of Classification Search
CPC .................................................. G06F 8/60–70
See application file for complete search history.

(56) References Cited

U.S. PATENT DOCUMENTS

| | | | | |
|---|---|---|---|---|
| 9,311,486 | B2* | 4/2016 | Ayanam | G06F 21/572 |
| 9,778,844 | B2* | 10/2017 | Balakrishnan | G06F 3/06 |
| 9,800,547 | B2* | 10/2017 | Lee | H04L 63/1441 |
| 9,851,996 | B2* | 12/2017 | Kochar | G06F 9/45558 |
| 10,289,424 | B2* | 5/2019 | Rathineswaran | G06F 9/4406 |
| 2015/0052596 | A1* | 2/2015 | Ayanam | G06F 21/572 726/8 |
| 2015/0331694 | A1* | 11/2015 | Balakrishnan | G06F 3/06 713/2 |
| 2017/0046152 | A1* | 2/2017 | Shih | G06F 8/654 |
| 2018/0060051 | A1* | 3/2018 | Ramalingam | G06F 8/61 |

OTHER PUBLICATIONS

"Redfish Scalable Platforms Management API Specification" Version 1.6.0; 128 pages, dated Aug. 23, 2018 (Year: 2018).*

* cited by examiner

*Primary Examiner* — Brian T Misiura
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes an initialization component of a host. The initialization component obtains a process file for dynamically creating a processing component on a management platform on a BMC of the host, the process file defining a logic to be implemented by the processing component, the initialization component operating to load an operating system of the host. The initialization component sends the process file to the BMC. The initialization component further sends a message to the BMC, the message including data to be processed by the processing component.

17 Claims, 4 Drawing Sheets

TECHNIQUES OF SECURELY PERFORMING LOGIC AS SERVICE IN BMC

BACKGROUND

Field

The present disclosure relates generally to computer systems, and more particularly, to a baseboard management controller (BMC) and an initialization component of a host that may operate together to dynamically generate a service implementing a particular logic at the BMC.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

In the server industry there is growing innovation on management aspects of the systems. A new method or feature is often required to be introduced in a BMC. As such, there is a need for a mechanism that securely and dynamically pushing logic scripts to a BMC at runtime.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes an initialization component of a host. The initialization component obtains a process file for dynamically creating a processing component on a management platform on a BMC of the host, the process file defining a logic to be implemented by the processing component, the initialization component operating to load an operating system of the host. The initialization component sends the process file to the BMC. The initialization component further sends a message to the BMC, the message including data to be processed by the processing component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In the server industry there is growing innovation on management aspects of the systems. A new method or feature is often required to be introduced in a BMC. As such, there is a need for a mechanism that securely and dynamically pushing logic scripts to a BMC at runtime.

As described infra, components that are allowed and authorized can push scripts that are approved at runtime and executed as part of the management eco-system. These scripts may be securely running inside a sandbox to block malicious code performing any damage to the BMC. These logic scripts can engage with a management platform. The management platform allows OEM extensions by which an OEM can introduce features that are not part of standard specification. OEM extensions can also be dynamically pushed as the logic scripts. The OEM extensions may then run as part of management platform as if it was a native feature.

Sometimes, components such as BIOS may not have all bus channels up for communication. Still it may need access to BMC data storage that are typically populated by end-user earlier. To resolve such cases, a OEM IPMI command (e.g., a DB ACCESS command) is introduced to provide access to BMC databases. This way BIOS can use BMC as a persistent storage throughout its lifecycle. BIOS can also push logic scripts to BMC when all bus channels are available and let those scripts manipulate the data which are pushed by the DB ACCESS command.

Figure 1:
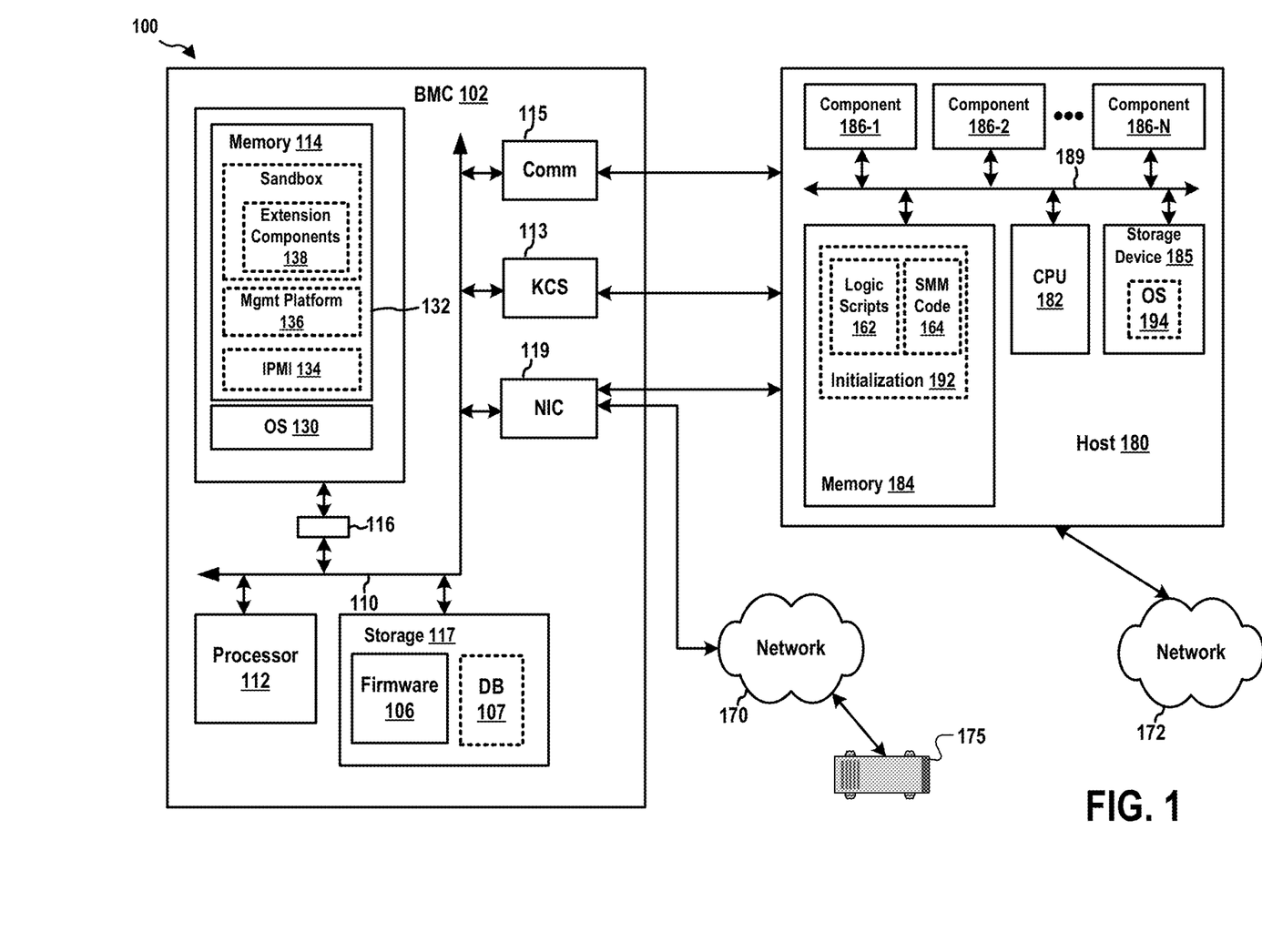
FIG. 1 is a diagram illustrating a computer system.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a KCS interface 113 (keyboard controller style), and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the KCS interface 113, and/or the communication interfaces 115 may be on the same chip. In addition, those components may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134 and a management platform 136. Further, the service components 132 may be implemented as a service stack. As such, the BMC firmware 106 can provide an embedded system to the BMC 102. In addition, the storage 117 may provide database(s) 107 that can be accessed by the IPMI services 134 or the management platform 136.

In addition, as described infra, the management platform 136 may at run time (i.e., dynamically) generate one or more extension components 138 based on process files. As described supra, the initialization component 192 may send process files 162 to the BMC 102. For example, the process files 162 can define functions that are currently not implemented by the management platform 136. In particular, a process file 162 may contain scripts for such purposes. The management platform 136 may use an engine to executes the scripts contained in the process files. By dynamically executing the process files 162, the engine can place the extension components 138 in the memory as part of the management platform 136.

Further, as a security measure, the extension components 138 may be contained in a sandbox of the memory 114 that isolates the extension components 138 from other programs in the memory 114. As such, the extension components 138 that may only have limited file system access and database access. Further, the extension components 138 may be Namespace restricted. The extension components 138 may be only given access under a particular folder in the file system. In addition, the engine may execute the scripts of the process files 162 through protected calls. As such, when a process file 162 causes errors, the errors do not cause the management platform 136 to corrupt. In this situation, the management platform 136 can remove the erroneous process file 162 and the particular extension component 138 generated according to that process file. Further, the management platform 136 may set a timer for executing a script. Execution of a script over a predetermined time period will be timed out.

In one example, the management platform 136 may implements REDFISH specification, as defined in "Redfish Scalable Platforms Management API Specification Document Identifier: DSP0266 Date: 2018 Apr. 5 Version: 1.4.1," which is published by Distributed Management Task Force (DMTF) and is expressly incorporated by reference herein in its entirety.

Further, the scripts may be Lua scripts and the engine may be Lua just-in-time (LuaJIT) interpreter/compiler. The extension components 138 may plugs into the management platform 136 implementing a REDFISH server that sends out JavaScript Object Notation (JSON) output for end-user. The extension components 138 may plug into the management platform 136 implementing a REDFISH backend to handle events, registered IPMI commands, system event log (SEL), etc. Furthermore, the extension components 138 may utilize the KCS interface 113 to access databases at the BMC 102.

Similar to static files, the process files 162 are static from the perspective of the initialization component 192. The process files 162 can be transferred through HTTP POST upload. Multiple process files 162 can be transferred as a zip file. A zip file must have an autostart.sh file that extracts folders as needed and perform additional initialization. This bash script will run with "chroot" access. In certain circumstances, on a successful file transfer, an one-time load of those new scripts may happen with a 1-3 seconds downtime.

In certain configurations, as described supra, the management platform 136 implements REDFISH specification. Further, the extension components 138 can be based on REDFISH OEM extensions. The extension components 138 may be available for a REDFISH server at north bound and/or for a sync Agent at south bound.

The extension components 138 may follow REDFISH OEM hook (interface) model for parsing a system event log (SEL) record entry. A sync agent of the management platform 136 may receive a SEL record entry from IPMI services 134. The extension components 138 attached to one or more hooks of the sync agent also receive SEL events for processing. As such, the extension components 138 can parse the SEL record entries and store the parsed data to corresponding one of the database(s) 107.

The management platform 136 may receive data from the initialization component 192 and/or, as described supra, from an interrupt handler provided by the initialization component 192. Upon receiving the data, the management platform 136 generates one or more platform events (e.g., REDFISH events) based on the data received from the interrupt handler. The extension components 138 registers with the management platform 136 to receive certain events. As such, the extension components 138 obtains relevant data sent from the host computer 180. The extension components 138 can use IPMI commands to, e.g., through the KCS interface 113, access the database(s) 107.

The BMC 102 may be in communication with the host computer 180 through the KCS interface 113, the network interface card 119, the communication interfaces 115, and/or the IPMI interface.

The host computer 180 includes a host CPU 182, a host memory 184, a storage device 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 402 shown in FIG. 4.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

In certain configurations, the initialization component 192 may use the BMC 102 as a storage area. The data sent to the BMC 102 from the initialization component 192 may need to formatted at the BMC 102 in accordance with a particular format before the data are stored in a database of the BMC 102. Further, different data may need to be stored in different databases according to some logic. As described supra, the initialization component 192 may be supplied with or generate the process files 162 that defines the logic or execution procedures for performing those tasks. The initialization component 192 may send the process files 162 to the management platform 136 through the network interface card 119 (or the KCS interface 113 and/or the communication interfaces 115). The initialization component 192 may also send to the management platform 136 static Hypertext Markup Language (HTML) files, Cascading Style Sheets (CSS) files, and/or Javascripts (JS) files. Those files may contain data to be processed or stored at the BMC 102. The data may include attribute registry, BIOS setup data, etc. Subsequently, a client at the remote device 175 may request data from the management platform 136. The management platform 136 may send to the client HTML/CSS/JS files and/or processed data (including attribute registry, BIOS setup data, etc.).

In certain configurations, during its operation, the host computer 180 may generate an interrupt (e.g., a system management interrupt (SMI)). The interrupt can trigger the host CPU 182 to execute an interrupt handler provided by the initialization component 192 and available in the host memory 184. The interrupt handler may send data (e.g., regarding the condition triggering the SMI) to the management platform 136.

As described supra, the management platform 136 uses an engine to execute the scripts (or instructions) contained in the process files 162, therefore generating the corresponding extension components 138. The extension components 138 can function as a logic execution layer between the initialization component 192 and the management components of the BMC 102. In particular, the extension components 138 may provide easier access to databases on the BMC 102.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
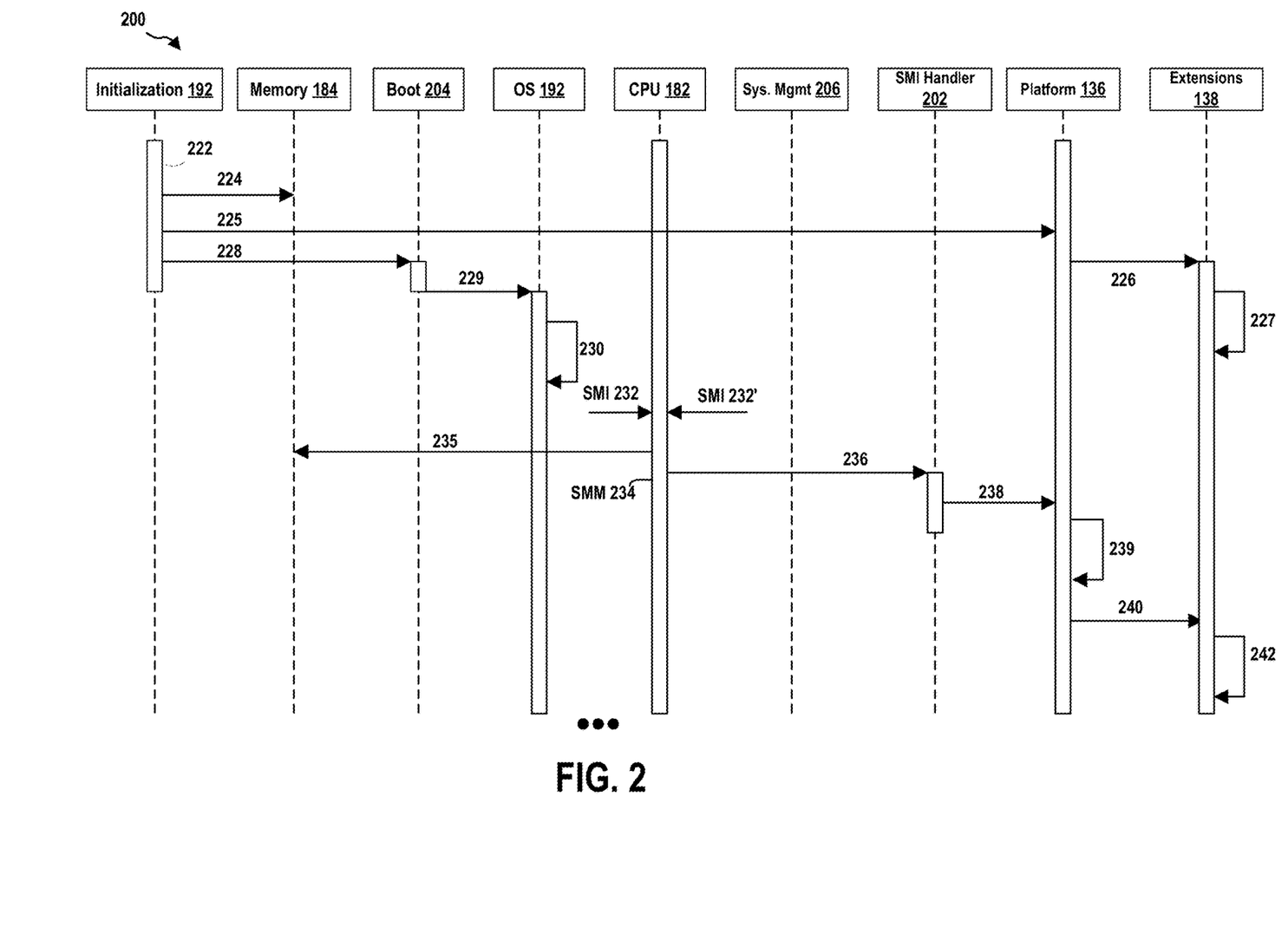
FIG. 2 is a diagram a sequence of procedures performed by the computer system.

FIG. 2 is a diagram 200 illustrating a sequence of procedures performed by the computer system 100. In procedure 222, the host computer 180 is powered on or reset. Accordingly, initialization component 192 starts an initialization process. As described supra, the initialization component 192 can obtain or generate the process files 162. The process files 162 may define one or more functionalities currently not implemented by the management platform 136. In this example, the process files 162 defines logic for handle memory module failures.

In procedure 224, the initialization component 192 stores a code and data for an SMI handler 202 at a particular location of the memory 114. As described infra, the host CPU 182 can be interrupted to enter a system management mode (SMM). When the host CPU 182 enters the SMM, the host CPU 182 executes the SMI handler 202 stored at the pre-configured location. The SMI handler 202 can be considered as part of the initialization component 192. Accordingly, the initialization component 192 can considered as the program being executed during the SMM. In this example, the host memory 184 may contain 16 memory modules. An SMI may be triggered when one or more of the 16 memory modules has failed. The SMI handler 202, when executed in response to an SMI, can collect data regarding the failed memory module. Further, the SMI handler 202 can send the collected data to the management platform 136.

In procedure 225, the initialization component 192 sends the process files 162 to the management platform 136. Upon receiving the process files 162, in procedure 226, the management platform 136 uses an engine to execute the process files 162 to generate and initiate the extension components 138. In procedure 227, the extension components 138 registers with the management platform 136 to subscribe certain platform events. The extension components 138 also establishes communication with the database(s) 107 (e.g., through the KCS interface 113) and gains access to the database(s) 107. In this example, the extension components 138, in accordance with the logic contained in the process files 162, can format data regarding the memory modules in the host memory 184 and can store the formatted data in a particular one of the database(s) 107.

In procedure 228, the initialization component 192 loads a boot program 204 (e.g., a bootstrap loader) from the storage device 185 into the host memory 184. In procedure 229, the boot program 204 loads the OS 194 from the storage device 185 into the memory 114.

In procedure 230, the OS 194 initializes and then operates to manage the resources of the host computer 180. The OS 194 may detect that one or more components of the host CPU 182, the host memory 184, the storage device 185, and the component devices 186-1 to 186-N have generated an error. In this example, the OS 194 may detect that one module of the host memory 184 has failed.

In procedure 232, in response to detecting the hardware components errors, the OS 194 can send a system management interrupt (SMI) to the host CPU 182. Further, the host computer 180 may have other system management components 206. The system management components 206 may include software components and/or hardware components. The system management components 206 monitors the health conditions of the host CPU 182, the host memory 184, the storage device 185, and the component devices 186-1 to 186-N. For example, the system management components 206 may monitor the temperature of the host CPU 182 or the voltage of the host memory 184. When the system management components 206 detects that one or more of the host CPU 182, the host memory 184, the storage device 185, and the component devices 186-1 to 186-N are in a predetermined health condition, the system management components 206 may, in procedure 232', send an SMI to the host CPU 182. The OS 130 can then send an SMI to the host CPU 182 in procedure 232 as described supra.

In procedure 234, after receiving the SMI, the host CPU 182 enters into a system management mode (SMM), during which normal operation of the OS 194 is suspended.

In procedure 235, the host CPU 182 reads the code and data of the SMI handler 202 from the pre-configured location of the host memory 184 (or another storage device such as a ROM) and, accordingly, executes the SMI handler 202. As such, in procedure 236, the SMI handler 202 gains control of the host CPU 182. The health data indicating health statuses/conditions of the hardware components may be provided to the SMI handler 202 by the OS 194 or the system management components 206. For example, the OS 194 or the system management components 206 may store the health data at a pre-configured location that is known by the SMI handler 202. Therefore, the SMI handler 202 can obtain the health data.

The SMI handler 202 is implemented with one or more management protocols (e.g., REDFISH) and knows that the extension components 138 generated on the management platform 136 previously can handle the health data. In this example, in procedure 238, the SMI handler 202 can use HTTP post to send the data to the management platform 136. Upon receiving the health data, the management platform 136, in procedure 239, accordingly generates an event specifying the health data received. The components on the management platform 136 and that have subscribed health data events will receive the events from the management platform 136. In this example, a particular extension component 138 subscribed heath data events.

Subsequently, in procedure 240, the particular extension component 138 receives the health data event the management platform 136. In this example, in procedure 242, the particular extension component 138 obtains data regarding the 16 memory modules of the host memory 184. The processes and formats the data. Further, the particular extension component 138 stores the formatted data to one of the database(s) 107. As such, a client at the remote device 175 can communicate with the particular extension component 138 to obtain health data of the host memory 184.

Figure 3:
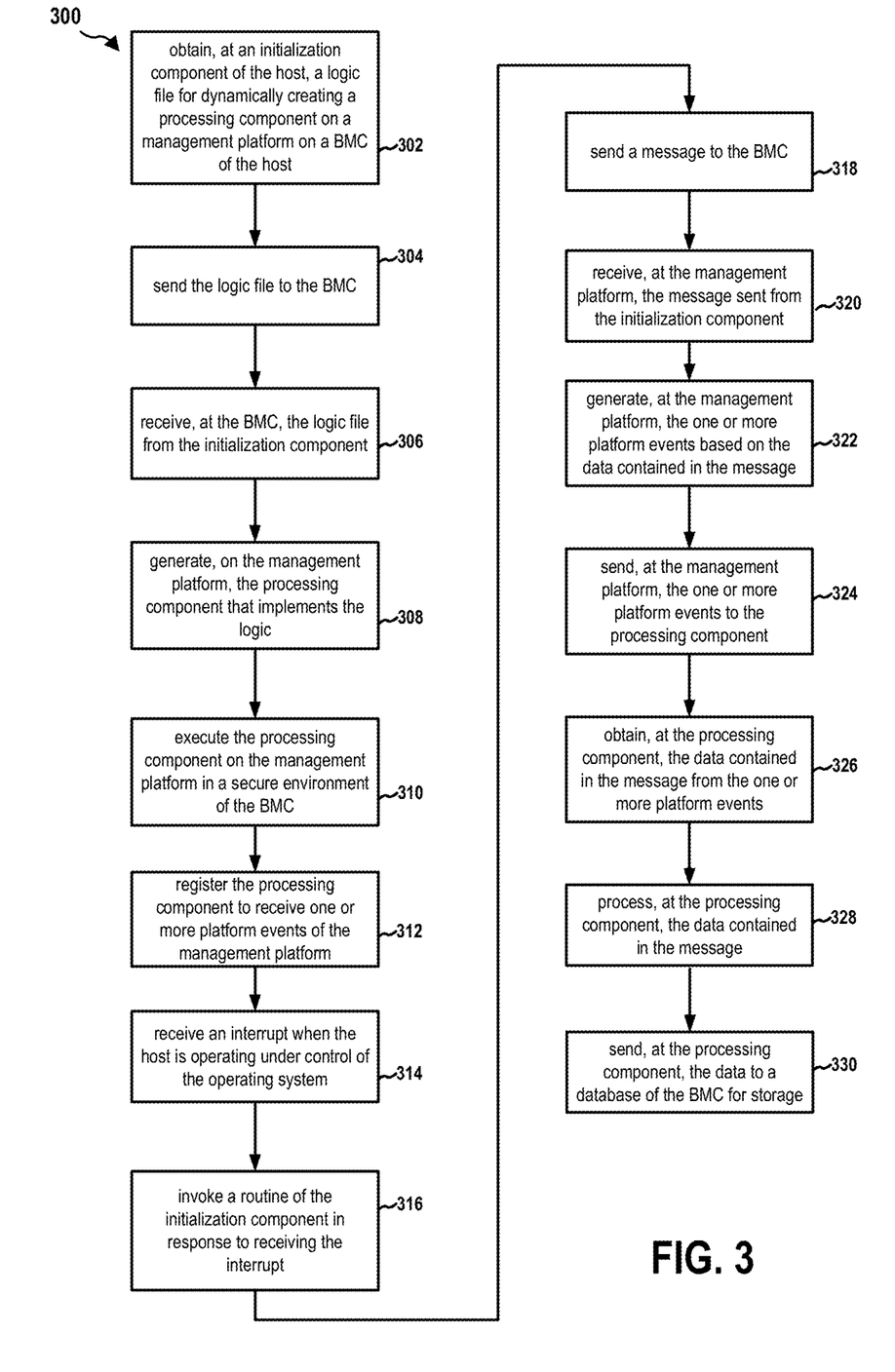
FIG. 3 is a flow chart of a method (process) for dynamically generating a processing component.

FIG. 3 is a flow chart 300 of a method (process) for dynamically generating a processing component. The method may be performed by a computer system (e.g., the computer system 100) including a host (e.g., the host computer 180) and a BMC (e.g., the BMC 102). The host includes an initialization component (e.g., the initialization component 192).

At operation 302, the initialization component of the host obtains a process file (e.g., the process files 162) for dynamically creating a processing component (e.g., the extension components 138) on a management platform (e.g., the management platform 136) on the BMC. The process file defines a logic to be implemented by the processing component. The initialization component operates to load an operating system (e.g., the OS 194) of the host. At operation 304, The initialization component sends the process file to the BMC.

At operation 306, the BMC receives the process file from the initialization component. At operation 308, the BMC generates, on the management platform, the processing component that implements the logic. At operation 310, the BMC executes the processing component on the management platform in a secure environment (e.g., a sandbox) of the BMC. In certain configurations, the processing component is executed in a just-in-time manner. At operation 312, the BMC registers the processing component to receive one or more platform events of the management platform.

At operation 314, the host receives an interrupt (e.g., the SMI in procedure 232) when the host is operating under control of the operating system. At operation 316, the host invokes a routine of the initialization component in response to receiving the interrupt. The routine generates a message. The message includes data to be processed by the processing component. At operation 318, the initialization component sends the message to the BMC in the routine.

At operation 320, the management platform receives the message sent from the initialization component. At operation 322, the management platform generates the one or more platform events based on the data contained in the message. At operation 324, the management platform sends the one or more platform events to the processing component. At operation 326, the processing component obtains the data contained in the message from the one or more platform events. At operation 328, the processing component processes the data contained in the message. At operation 330, the processing component sends the data to a database of the BMC for storage.

Figure 4:
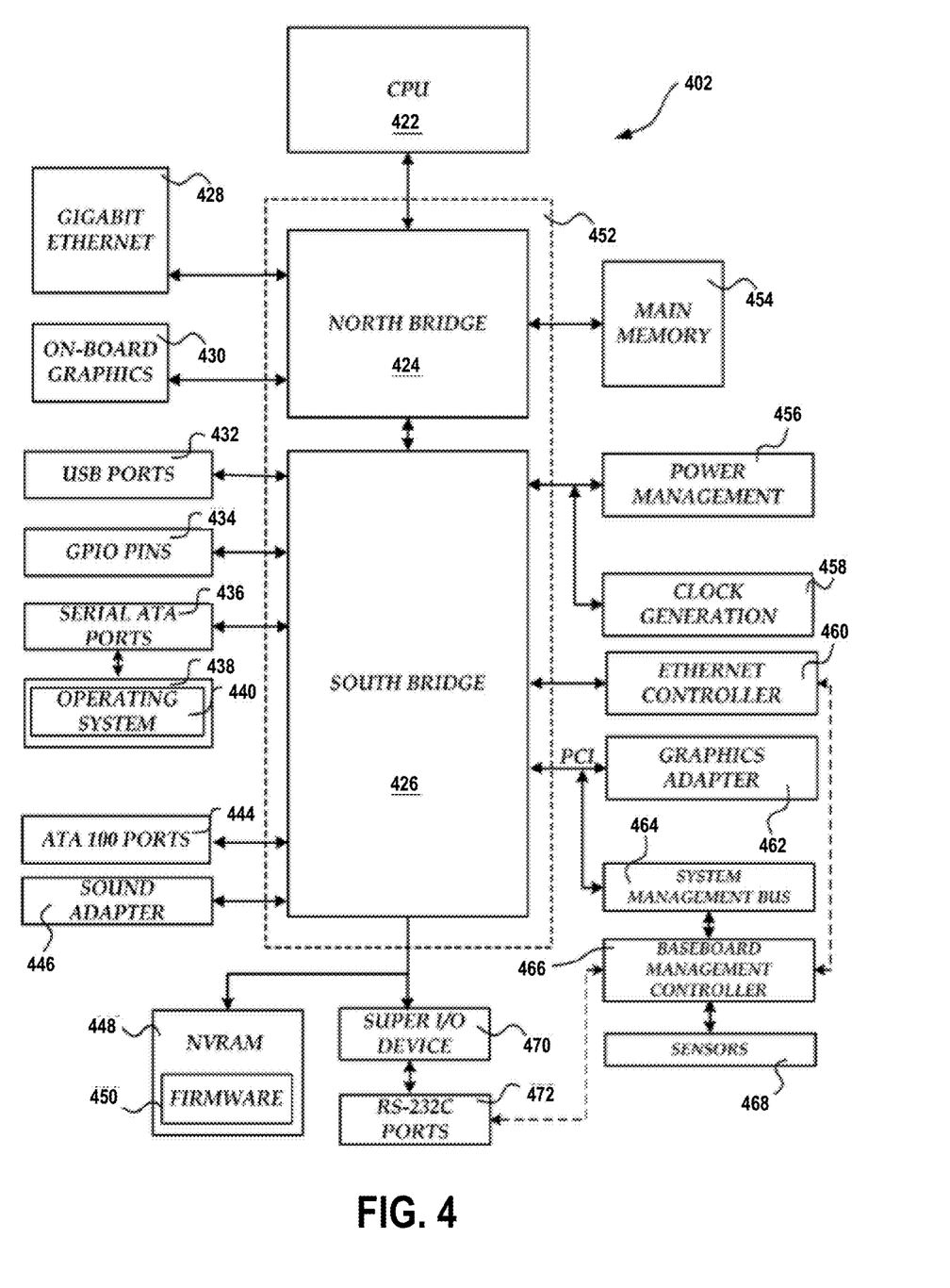
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 180, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including a host, comprising:
   obtaining, at an initialization component of the host, a process file for dynamically creating a processing component on a management platform on a baseboard management controller (BMC) of the host, the process file defining a logic to be implemented by the processing component, the initialization component operating to load an operating system of the host;
   sending the process file to the BMC;
   receiving an interrupt when the host is operating under control of the operating system;
   invoking a routine of the initialization component in response to receiving the interrupt, the routine generating the message, wherein the message is sent to the BMC in the routine; and
   sending a message to the BMC, the message including data to be processed by the processing component.

2. The method of claim 1, the computer system further including the BMC, the method further comprising:
   receiving, at the BMC, the process file from the initialization component;
   generating, on the management platform, the processing component that implements the logic; and
   executing the processing component on the management platform in a secure environment of the BMC.

3. The method of claim 2, wherein the processing component is executed in a just-in-time manner.

4. The method of claim 2, further comprising:
   receiving, at the management platform, the message sent from the initialization component; and
   processing, at the processing component, the data contained in the message.

5. The method of claim 4, further comprising:
   registering the processing component to receive one or more platform events of the management platform;
   generating, at the management platform, the one or more platform events based on the data contained in the message;
   sending, at the management platform, the one or more platform events to the processing component; and
   obtaining, at the processing component, the data contained in the message from the one or more platform events.

6. The method of claim 2, further comprising:
   sending, at the processing component, the data to a database of the BMC for storage.

7. A computer system, comprising:
   a host, including
     a first memory; and
     a first processor of at least one processor coupled to the first memory and configured to:
     obtain, at an initialization component of the host, a process file for dynamically creating a processing component on a management platform on a baseboard management controller (BMC) of the host, the process file defining a logic to be implemented by the processing component, the initialization component operating to load an operating system of the host;
     send the process file to the BMC;
     receive an interrupt when the host is operating under control of the operating system;
     invoke a routine of the initialization component in response to receiving the interrupt, the routine generating the message, wherein the message is sent to the BMC in the routine; and
     send a message to the BMC, the message including data to be processed by the processing component.

8. The computer system of claim 7, wherein the computer system further includes the BMC, wherein the BMC includes
   a second memory; and
   a second processor of the at least one processor coupled to the second memory and configured to:
   receive, at the BMC, the process file from the initialization component;
   generate, on the management platform, the processing component that implements the logic; and
   execute the processing component on the management platform in a secure environment of the BMC.

9. The computer system of claim 8, wherein the processing component is executed in a just-in-time manner.

10. The computer system of claim 8, wherein the second processor of the at least one processor is further configured to:
    receive, at the management platform, the message sent from the initialization component; and
    process, at the processing component, the data contained in the message.

11. The computer system of claim 10, wherein the second processor of the at least one processor is further configured to:
    register the processing component to receive one or more platform events of the management platform;
    generate, at the management platform, the one or more platform events based on the data contained in the message;
    send, at the management platform, the one or more platform events to the processing component; and
    obtain, at the processing component, the data contained in the message from the one or more platform events.

12. The computer system of claim 8, wherein the second processor of the at least one processor is further configured to:
    send, at the processing component, the data to a database of the BMC for storage.

13. A non-transitory computer-readable medium storing computer executable code for operating a computer system, the computer system including a host, comprising code to:
    obtain, at an initialization component of the host, a process file for dynamically creating a processing component on a management platform on a baseboard management controller (BMC) of the host, the process file defining a logic to be implemented by the processing component, the initialization component operating to load an operating system of the host;
    send the process file to the BMC;
    receive an interrupt when the host is operating under control of the operating system;
    invoke a routine of the initialization component in response to receiving the interrupt, the routine generating the message, wherein the message is sent to the BMC in the routine; and send a message to the BMC, the message including data to be processed by the processing component.

14. The non-transitory computer-readable medium of claim 13, wherein the computer system further includes the BMC, wherein the code is further configured to:
receive, at the BMC, the process file from the initialization component;
generate, on the management platform, the processing component that implements the logic; and
execute the processing component on the management platform in a secure environment of the BMC.

15. The non-transitory computer-readable medium of claim 14, wherein the processing component is executed in a just-in-time manner.

16. The non-transitory computer-readable medium of claim 14, wherein the code is further configured to:
receive, at the management platform, the message sent from the initialization component; and
process, at the processing component, the data contained in the message.

17. The non-transitory computer-readable medium of claim 16, wherein the code is further configured to:
register the processing component to receive one or more platform events of the management platform;
generate, at the management platform, the one or more platform events based on the data contained in the message;
send, at the management platform, the one or more platform events to the processing component; and
obtain, at the processing component, the data contained in the message from the one or more platform events.

* * * * *